Jan. 2, 1962  E. A. CARLSON  3,015,447
CONTROL APPARATUS
Filed March 23, 1959
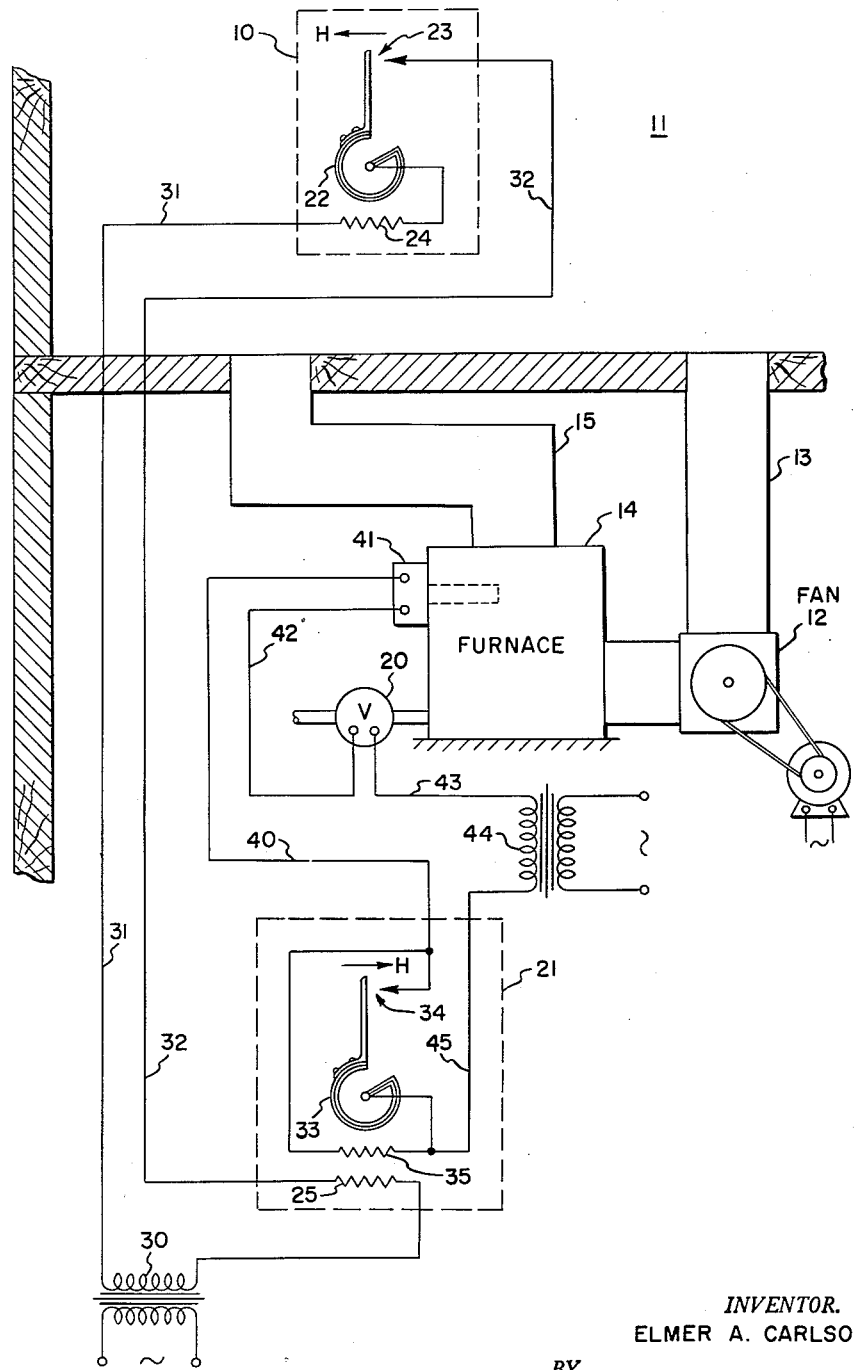
INVENTOR.
ELMER A. CARLSON
BY
*Clyde C. Blinn*
ATTORNEY

United States Patent Office 3,015,447
Patented Jan. 2, 1962

3,015,447
CONTROL APPARATUS
Elmer A. Carlson, Richfield, Minn., assignor to Minneapolis-Honeywell Regulator Company, Minneapolis, Minn., a corporation of Delaware
Filed Mar. 23, 1959, Ser. No. 801,322
3 Claims. (Cl. 236—68)

The present invention is concerned with an improved temperature control system; in particular, the control system has space thermostat and a slave thermostat which controls the temperature changing apparatus.

As temperature conditioning equipment becomes more complicated, the size and the complication of the average space or room thermostat has greatly increased. A room thermostat for residential use to control heating and cooling equipment often contains more than one temperature responsive device and several switches associated with each of the temperature responsive devices. In order to enclose the components needed to control the elaborate heating and cooling equipment, the case for such a thermostat becomes large and bulky. Such thermostats also impose problems in ornamental design.

The present temperature control system makes use of a space or room thermostat which sends a signal to a slave thermostat which is located at some remote point away from the main room thermostat. The slave thermostat amplifies the signal obtained from the main thermostat to control various types of conditioning apparatus connected to the slave thermostat. The main space thermostat can be relatively simple. Such a thermostat is generally a less expensive design and is more adapted to the use of ornamental and ascetic features.

While it is recognized that the use of a slave type thermostat associated with a main sensing thermostat is broadly old, the present invention incorporates a feedback heater in the slave thermostat to increase the controlling ability and stability of the combination.

Therefore, an object of the present invention is to provide an improved temperature control system;

Another object of the present invention is to provide in a temperature control system having a main sensing thermostat and a slave unit having a feedback conditioning means for stabilizing and increasing the response of the control system.

And still another object of the present invention is to provide in a temperature control system a main thermostat for cyclically pulsing a heater in a slave thermostat and a second heater in the slave thermostat energized cyclically by the slave thermostat.

These and other objects of the present invention will become apparent upon the study of the specification and drawing of which a single figure discloses the schematic diagram of the improved temperature control system.

Referring to the single figure, a space or a room thermostat 10 is located in a space 11 in which the temperature is being controlled. Air is circulated from space 11 by a fan 12 through a return duct 13 and into a furnace 14; so that, the air is heated and supplied to the space through a supply duct 15. While one typical conditioning system is shown for explanation purposes, the invention can be readily applied to other types of conditioning systems.

Furnace or conditioning apparatus 14 receives fuel through a valve or actuator 20 which is under the control of a slave thermostat 21. Thermostat 10 has a temperature responsive element 22 which controls the operation of a switch 23 to close the switch upon a decrease in space temperature below a predetermined value. An electrical heater 24 is thermally located inside thermostat 10. A second electrical heater 25 is thermally located inside the slave thermostat 21. Space thermostat 10 is electrically connected to slave thermostat 21 by a circuit traced as follows: from one side of a secondary winding 30 of a source of power to a conductor 31, heater 24, switch 23, a conductor 32, heater 25, and back to the other side of secondary 30. When switch 23 closes heaters 24 and 25 are simultaneously energized. Heater 24 falsely heats thermostat 10 to cause switch 23 to open before the space temperature satisfies the thermostat. After switch 23 opens and the temperature responsive means cools down, the switch closes again to re-energize heater 24. A cyclic operation of switch 23 takes place; so that, the total closed time of switch 23 and thus the total on-time of heaters 24 and 25 is proportional to the difference between the actual space temperature in space 11 and the control point or calibration temperature of thermostat 10. The temperature established in the slave thermostat 21 by heater 25 is proportional to the heat load experienced by space 10. Since the size of the heater 25 and the mass of the temperature responsive element or bimetal 33 in the slave unit 21 can be designed depending upon the power needed by the slave unit 21, an amplification of the signal of thermostat 10 is obtained. While only one switch 34 is shown to be controlled by the temperature responsive element 33, the slave unit or actuator might be quite complicated having numerous switches for controlling various functions in the conditioning system for supplying the needs of space 11. Since the slave unit 21 is not necessarily mounted in space 11, the physical size of the unit makes little difference as far as the ornamental aspects of thermostat 10 is concerned. While heretofore numerous switches were placed in thermostat 10, now, the switches can be placed in slave unit 21.

The slave unit 21 has a second heater 35 thermally associated with responsive element 33. Heater 35 is connected in parallel with switch 34. Switch 34 is connected to control valve 20 through a conventional circuit traced as follows: from switch 34 to conductor 40, through a conventional temperature limit control 41, a conductor 42, valve 20, a conductor 43, a secondary winding 44, of a source of power, a conductor 45, and back to switch 34. Heater 35 is connected to the secondary 44; however, whenever switch 34 closes, heater 35 is shunted by a shorting circuit to cut down the current of the heater. Heater 35 is an anticipating means which feeds back a signal to unit 21 each time valve 20 is opened to stabilize the system.

Whenever thermostat 10 experiences a heating load in space 11, the temperature level established in the slave thermostat 21 by heater 25 is adjusted as a function of space temperature 11. Temperature responsive element 33 closes switch 34 when the temperature of the slave unit exceeds some predetermined value. As heater 35 is energized when switch 34 is open, the heat from heater 35 will increase the temperature of the slave thermostat 21 and switch 34 will close. Valve 20 and thus the furnace will be energized to deliver heat to space 11. Upon the de-energization of heater 35 when switch 34 closes, the temperature of the slave unit begins to drop. Switch 34 and heater 35 will cyclically operate to have a predetermined closed time depending upon the temperature level of the slave unit as established by heater 25. The importance of heater 35 in providing the cyclic operation of the slave unit 21 should not be overlooked. Without anticipation heater 35, slave unit 21 would provide a low response control system, and temperature control by the space thermostat would be very unsatisfactory. Thermostat 33 which controls valve 20 responds to the level of the temperature in housing 21; however, furnace 14 does not immediately effect thermostat 10 which controls the output of heater 25. Some thermal delay is interposed in the system by the transfer of the signal from thermostat 10 to thermostat 33. Furthermore, even if the effect of furnace 14 on chamber 21 by means of thermostat 10 and heater 25 was fast, some thermal delay would exist in thermostat 33. To overcome the lag in the system, heater 35 cycles switch 34 to anticipate the effect of furnace 14 to obtain satisfactory control of the temperature in space 11. Without heater 35, furnace 14 would continue on or off operation until thermostat 33 was changed by the operation of thermostat 10. Heater 35 provides a means to turn on or off the furnace independent of the temperature of space 11, but the on-off relationship of the furnace is determined by the average temperature of space 11; rather than, the cyclical variations of the temperature of space 11.

During the operation of the improved temperature control system, the cyclic energization of heater 25 by thermostat 10 depending upon the heat load of space 11 provides a means using slave thermostat 21 for controlling a number of functions of a conditioning apparatus. Slave unit 21 can be large and bulky, and by the proper selection of the size of heater 25, the correct amplification factor can be provided to amplify the signal of thermostat 10. The response of the system is increased by the addition of heater 35 to cyclically offset the temperature or environmental condition of slave unit 21 and to cyclically energize the condition changing apparatus or valve 20 at a rate depending upon the environmental condition or temperature of the slave unit established by heater 25.

While only one specific showing of the present invention is disclosed and described in the specification, other modifications would be apparent to one skilled in the art; therefore, the applicant intends to limit his invention only by the scope of the appended claims in which I claim:

1. In a temperature control for controlling a heat furnishing device to supply heat to a space, a space temperature responsive switch means which closes a circuit upon a decrease in space temperature below a predetermined value, a first electrical heater mounted in thermal relation to said temperature responsive switch means, temperature responsive actuator means having a first switch which is closed when said actuator means is heated above a predetermined temperature, a second electrical heater mounted in thermal relation to said actuator means, a source of power, circuit connection means connecting said space switch means, said first heater, and said second heater in a series circuit to said source of power whereby as the temperature of the space drops said space switch means energizes said first heater and said second heater to heat said actuator means, said first heater causing said space switch means to have an on-time depending upon the amount the space temperature has dropped below said predetermined value, an anticipating heater mounted in thermal relation to said actuator means, circuit connection means connecting said anticipating heater in parallel with said first switch, and circuit means adapted to connect said first switch to control the heat furnishing device whereby upon the closing of said first switch said anticipating heater is de-energized to modify the operation of said actuator means.

2. In a temperature control system, space temperature responsive means providing a closed circuit whenever the temperature of said responsive means drops below a predetermined value, a first heat source associated with said responsive means adapted to provide a closed circuit for a percentage of the total time depending upon the temperature of the space, temperature responsive actuator means, a source of power, a second heat source associated with said actuator means, circuit means connecting said space responsive means, said first heater, and said second heater in series to said source of power so that the average temperature maintained by said second heater is a function of said percentage of time, a control means for controlling the operation of a temperature conditioning device for said space, means connecting said actuator means to control said control means, and feedback heater means associated with said actuator means for supplementing said second heater when said control means is de-energized to stabilize said control system by modifying the operation of said control means.

3. In a temperature control system, temperature responsive means responsive to a space temperature, second temperature responsive means, heater means thermally connected to said first temperature responsive means to satisfy said responsive means whereby the total on-time of said first responsive means is indicative of the heat load of the space, a second heater means thermally associated with said second temperature responsive means, connection means connecting said first responsive means to said second heater means to heat said second responsive means by an amount proportional to said total on-time, a control means adapted to control a temperature changing means for changing the temperature of the space, a third heater thermally associated with said second temperature responsive means, connection means adapted to connect said second temperature responsive means in controlling relation to said control means, and further means connecting said third heater to be energized each time said control means is de-energized whereby the response of said system is increased by the anticipating effect established by said third heater to shut down said changing means before said second temperature responsive means reaches a selected temperature.

References Cited in the file of this patent

UNITED STATES PATENTS

| | | |
|---|---|---|
| 1,961,252 | Shivers | June 5, 1934 |
| 2,006,658 | Smulski | July 2, 1935 |
| 2,052,536 | Shivers | Aug. 25, 1936 |
| 2,329,473 | Landon | Sept. 14, 1943 |
| 2,548,983 | Klug | Apr. 17, 1951 |
| 2,758,791 | Jenkins | Aug. 14, 1956 |

FOREIGN PATENTS

| | | |
|---|---|---|
| 685,659 | Germany | Dec. 21, 1939 |